United States Patent [19]

Kazan

[11] 4,280,125

[45] Jul. 21, 1981

[54] THIN VACUUM PANEL DISPLAY DEVICE

[75] Inventor: Benjamin Kazan, Palo Alto, Calif.

[73] Assignee: Xerox Corporation, Stamford, Conn.

[21] Appl. No.: 61,349

[22] Filed: Jul. 27, 1979

[51] Int. Cl.³ .......... G06F 3/14

[52] U.S. Cl. .......... 340/795; 340/781; 340/811; 340/794; 340/166 EL; 358/230; 250/213 A; 250/368

[58] Field of Search .......... 340/713, 714, 720, 770, 340/772, 781, 795, 166 EL, 380, 703, 704; 250/213 A, 213 VT, 227, 578, 368; 358/241, 230

[56] References Cited

U.S. PATENT DOCUMENTS

| | | | |
|---|---|---|---|
| 3,255,372 | 6/1966 | Michlin | 340/720 |
| 3,369,125 | 2/1968 | Dueker | 340/794 |
| 3,700,802 | 10/1972 | Markin et al. | 358/230 |
| 3,801,817 | 4/1974 | Goodman | 250/368 |
| 3,825,922 | 7/1974 | Ralph | 340/811 |
| 3,940,757 | 2/1976 | Purchase | 250/213 A |
| 3,947,842 | 3/1976 | Hilsum et al. | 340/794 |
| 3,967,265 | 6/1976 | Jacob | 340/794 |
| 4,031,552 | 6/1977 | Bosserman et al. | 340/700 |

*Primary Examiner*—Marshall M. Curtis
*Attorney, Agent, or Firm*—Serge Abend

[57] ABSTRACT

A thin vacuum panel cathode ray display device for providing visible information upon a phosphor layer, on a viewing wall, in response to electron beam excitation. Electron beams are generated by cathodes on an electron source wall spaced from the viewing wall. The cathodes comprise an array optical waveguides each coated with a photoemissive material. Between the cathode array and the phosphor layer, and adjacent to the cathodes, is an array of grid members for selectively controlling the flow of electrons to the phosphor layer in response to low voltage signals applied to the grid members. Light energy is sequentially introduced into each of the waveguides while simultaneous control signals are applied to all of the grid members to provide line-at-at-time information display upon the phosphor layer.

10 Claims, 3 Drawing Figures

THIN VACUUM PANEL DISPLAY DEVICE

Figure 1:
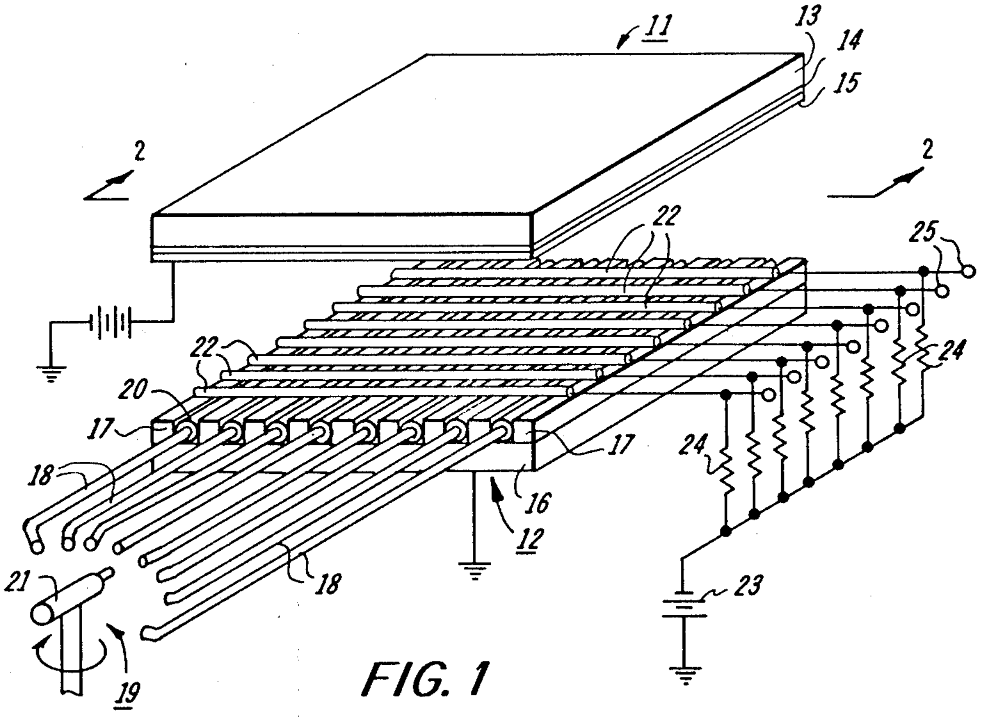

This invention relates to a thin vacuum panel display device of the cathode ray type wherein a plurality of cathodes are provided in the form of an array of optical waveguides, each coated with a photoemissive material. Adjacent to these is an array of grid members for selectively controlling the flow of electrons to a phosphor coated anode of the display panel, in response to low voltage signals applied to the grid members.

Thin panel cathode ray display devices have been investigated for a number of years as a space saving alternative to the bulky funnel shaped cathode ray tubes. However, attempts to date have not achieved the desired "thinness" because they comprise complex, bulky, and therefore expensive, internal constructions. Furthermore, their uniformity and reliability of performance have been poor.

As an example of such complex flat cathode ray display devices, there is taught in U.S. Pat. No. 3,935,500 a stack of internal control plates interposed between a matrix of high power consuming heater cathodes and the viewing screen. Another form of complex structure is taught in U.S. Pat. No. 4,124,123 wherein a number of vanes is provided which include structures thereon for initiating, controlling and directing the output of an electrical discharge.

A known structure of somewhat greater structural simplicity than those discussed above is to be found in U.S. Pat. No. 2,926,286 wherein orthogonal control electrode arrays control electron flow at selected X-Y coordinates. A shortcoming of this device resides in the dependence upon a cold cathode area-type electron emitter with its poor life characteristics and its inherent instability yielding non-uniform electron emissions. Greater simplicity of construction is to be found in the gas discharge display device of U.S. Pat. No. 3,890,609 wherein a matrix of cathode and anode conductors serves both to generate an electric discharge at selected addressed cross points and to excite the phosphor coating on one of the anode conductors at that point. Shortcomings of this device include a brightness limitation due to limited peak currents, limitations in life due to sputtering, jitter in the displayed information caused by erratic delays in the firing of the gas discharges.

It is the purpose of this invention to significantly simplify the structure of a thin vacuum panel cathode ray display device, to reduce the thickness and to provide such a device with uniformity, reliability and a high brightness capability.

These purposes may be achieved in one form by providing a thin vacuum panel display device including a pair of orthogonal arrays of electron emitters and control members, the emitters being in the form of optical waveguides coated with a photoemissive material such that when each waveguide is optically addressed, photoelectrons will be emitted from it over its entire coated length. The associated control members normally block the passage of photoelectrons to the anode. However, when addressed by a low voltage, the control members permit the flow of photoelectrons toward the phosphor coated anode of the display panel. The low voltage control utilized is compatible with integrated circuit technology.

Figure 2:
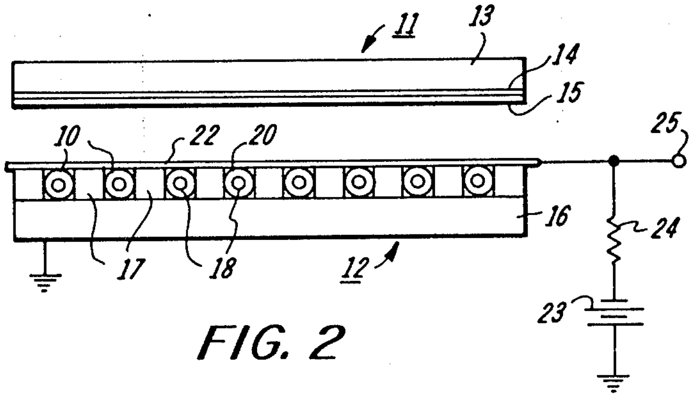
Figure 3:
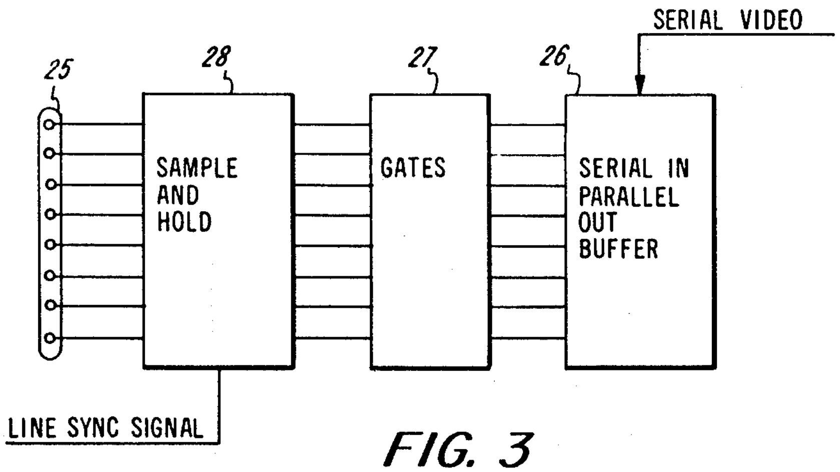

One way of carrying out this invention is described in detail below with reference to the drawings in which:

FIG. 1 is a perspective view showing the thin vacuum panel cathode ray display device of this invention, FIG. 2 is a cross sectional view taken substantially along line 2—2 of FIG. 1, and FIG. 3 is a schematic representation of one form of control circuitry for addressing this device.

With particular reference to the drawings there is shown in FIG. 1 a thin vacuum panel cathode ray display device comprising two spaced, generally parallel walls 11 and 12. Wall 11, comprising the viewing structure, includes a transparent support member 13 such as a glass panel, for observation of the information made visible on a phosphor layer 14 deposited thereon. The phosphor layer 14 is overcoated with a very thin film 15 of aluminum or other suitable conductor which is maintained at a high potential, e.g. 10–15 KV, sufficient to accelerate the electrons to a high velocity. Alternatively, the thin aluminum overcoating may be replaced by any of a number of thin transparent conductive coatings interposed between the glass layer 13 and the phosphor layer 14.

Wall 12, comprising the electron source, includes a support member 16, preferably of conductive material upon which are formed or attached elongated opaque insulating ribs 17, disposed substantially parallel to one another. Supported and secured within the grooves between the ribs 17 are optical waveguides 18, one guide placed in each groove in order to isolate each from the next adjacent ones to prevent optical cross talk. One form of the optical waveguide is the glass optical fiber shown in FIGS. 1 and 2. An acceptable variant could comprise "casting" a suitable optical waveguide material within the grooves.

The waveguides extend from one edge of wall 12, on which they are supported, to the opposite edge and beyond to a light injection station 19. On each of the optical fibers 18, a coating of photoemissive material 20 is deposited over at least the arcuate portion facing the phosphor layer 14. If desired, the entire circumference of each fiber could be coated to simplify manufacturibility.

To provide a continuous source of electrons as they are depleted from the photoemissive material, intimate contact is maintained between the grounded conductive support 16 and the photomissive material, along its length, as shown.

In FIG. 1 the light injection station 19 is illustrated as a location where the ends of optical fibers 18 are arranged in a circle of small diameter so as to allow them to be sequentially circularly scanned by a suitable high intensity light source 21. Other light injecting configurations may be employed, several alternatives being discussed below.

Positioned above the optical waveguides 18 is an array of control members 22 which serve to modulate the local photocurrents able to reach the phosphor layer 14. The form of the control members as illustrated in FIGS. 1 and 2 comprises an array of wires supported substantially perpendicular to the optical waveguide array, supported upon and secured to the ribs 17. As with the optical waveguides 18, each control wire 22 extends from one edge of wall 12 to the opposite edge and beyond. A bias potential source such as the negative terminal of battery 23 is connected to each control wire through individual load resistors 24 and a pulsed input signal source 25 is also connected to each control wire. The bias potential source serves to suppress the flow of electrons from the photoemissive material 20 whereas the more positive pulsed signal allows selective flow of electrons around and past the control wires into the zone between the plates 11 and 12 where the electrons will be under the influence of the high potential maintained on wall 11.

An alternative construction of the control members 22 may be in the form of thin strips of conductive material having fine perforations which will allow electrons to pass therethrough. Thus, when the control members are pulsed, they will provide sharper control characteristics and permit a reduced voltage swing to be used to control the flow of current.

Fabrication of this display device is made relatively simple because the ribs 17 serve to assure alignment of the optical fibers 18 and support the control wires 22 the desired distance above the optical fibers. The spacing between the photoemissive material and the control wires is made relatively small, thus preventing the high potential (e.g. 10–15 KV) anode from drawing to the phosphor any photoelectrons from local areas when the control wires are negatively biased. Once the electron source elements have been put in place, thin spacers may be inserted along the peripheries of walls 11 and 12 and the peripheries then sealed. For evacuation, a small tubulation is provided in a suitable location. A vacuum is then drawn and the tubulation is sealed off. Support members 13 and 16 must ordinarily be sufficiently thick to withstand external air pressure. However, in order to obviate the necessity of thick walls, a number of additional internal insulating supporting spacers (not shown) may be added on the surface of the ribs 17, extending between the control wires to the phosphor layer, to provide distributed support for the walls.

As an example of the dimensions contemplated by this invention, a twelve inch square display device might be constructed as follows. The insulating ribs 17 on metal plate 16 may be five mils wide by five mils high on ten mil centers. Optical fibers 18 may be four mils in diameter so as to lie below the plane defined by the top surfaces of the ribs. Control wires 22 may be five mils in diameter, also on ten mil centers. Thus, each of the arrays, the optical fibers 18 and the control wires 22, includes 1000 lines. The phosphor coated inner surface of wall 11 may be about five millimeters above the control wires.

Turning now to the generation and control of the phosphor exciting electrons, an example of suitable values is provided. It is assumed that an output image with a brightness of 50 foot Lambert (fL) is to be produced, which is comparable to known cathode ray tubes. In the example given above, since the panel is one square foot in area, by definition an output of 50 lumens would be required. Assuming that a phosphor is used having a luminous efficiency of about 50 lumens per watt, approximately one watt of average electrical power must reach the phosphor over its integrated area. Suitable phosphors for this purpose are, for example, P4 (Zn S:Ag+ZnCdS: Ag) which typically yields 43.5 lumens/watt, P22G (Zn CdS: Ag) which typically yields 69 lumens/watt and P31 (ZnS:Cu) which typically yields 50.6 lumens/watt. These values were obtained from the ITT phosphor data chart entitled "Typical Absolute Spectral Response Characteristics of Aluminized Phosphor Screens."

With the phosphor layer maintained at 10 KV, a peak photo-current of about 100 $\mu$a from each of the 1000 photoemissive lines is required to produce the average power and brightness set forth above. To get the desired 100 $\mu$a of current from the photoemissive material it is necessary that sufficient power be available from the light source and that the exciting light source and photoemissive material have a proper spectral match. For example, if a 10 mw He-Ne laser operating at a wavelength of 6300 Å is selected it is assumed that approximately 30% of this, about 3 mw will be dissipated in the photoemissive material. Under these conditions, a suitable photoemissive material would be an S-20 multialkali photocathode (Cs-Na-K-Sb) which typically yields about 35–40 ma/watt at an exciting wavelength of 6300 Å (see Sommer, "Photoemissive Materials", John Wiley and Sons, Inc., 1968 (pp 114–120)). Thus, given a laser energy of 3 mw and a photoemitter yielding 35 ma/watt a resultant photocurrent of about 100 $\mu$a may be obtained from each fiber in sequence as desired to obtain the 50 lumen average brightness from the phosphor layer.

In order that the display device operate in its intended manner it is desirable that the emission of photoelectrons be uniform over the length of each coated fiber. For this purpose, the optical energy absorbed per Unit length of fiber should be constant. Several methods of controlling this absorption can be employed. In one method, the photoemissive layer can be gradually increased in thickness over the length of the optical waveguide, with the thickness being greatest at its remote end where the light intensity is the least, thus allowing more photoelectrons to be emitted per unit of light energy. Alternatively, the optical waveguide surface may be frosted in a graded manner along its length to vary the light energy absorbed in the photoemissive layer. Still another method is to make the remote end of each of the waveguides highly reflective to cause additional light energy to be absorbed from the light traveling in the reverse direction.

As illustrated and described above light energy may be sequentially injected into the optical fibers using a rotating beam light source. It is also possible to group the fiber ends into a matrix array and to sequentially optically couple light to them from a small CRT, having a standard faceplate or a fiber-optic faceplate. Another possible addressing arrangement involves the use of an extended light source with an array of individual light valve elements provided to control the entry of light into each fiber. Still another possible configuration might be an array of solid state lasers, one for each optical waveguide, with each excited in sequence.

In typical operation, the thin vacuum panel display device of this invention would be addressed with signals of low voltage and current in line-at-a-time fashion. Light is injected via the light source 21, or any other suitable device, into the optical fibers 18 sequentially in a controlled timed manner. As each fiber is illuminated, photoemission takes place substantially instantaneously since the response time of photoemission is of the order of $10^{-12}$ seconds. By simultaneously addressing all of the control wires it is possible to generate visible information corresponding to one line of the display panel using the photocurrent from a single fiber. Flow of photocurrent from the fiber to the phosphor is normally suppressed by the negative bias voltage (e.g. −5 volts) on each of the control wires. By switching the potential of selected control wires to a more positive valve with respect to the normal bias, selected points along a given line, corresponding to the optically excited fiber, may be caused to emit light by electron bombardment of the phosphor layer. In a similar manner successive lines may be addressed with new information to generate a complete image.

In FIG. 3 there is illustrated in general schematic form a switching circuit capable of providing line-at-a-time signal input to the control wires in response to a serial video signal. A serial flow of informational signals into a suitable serial in, parallel out line buffer 26 will group signals for each of the control members, in this case numbering 1000. Once the line buffer is loaded with a complete line of data the entire line of signals may be shifted out through known gates 27 to a known sample and hold circuitry 28 which will switch selected control members for a sufficiently long time interval to activate the phosphor layer. Proper timing of the line-at-a-time signal dump may be provided by a line sync signal for opening the normally closed gates at the end of the forward scan, i.e. during flyback and closing the gates during scanning. The line sync signal should also be connected to the sample and hold circuitry to clear any residual charge therefrom.

It should now be readily understood that a primary advantage of the addressing system of this invention is its extremely high speed switching due to the substantially instantaneous generation of photoelectrons along the optical waveguide photocathodes. A further advantage is the elimination of half select problems associated with many X-Y addressed flat panels which allow undesired elements to be partially excited.

Although in the above description a single phosphor layer has been indicated yielding a single color output, multicolor images are also comprehended by this invention. In one form, color images may be achieved with successive stripes of red, green and blue phosphors aligned adjacent one another on the support member 13. If these strips run in the direction of the control members, one control element could be provided in registry with each strip. In this case, energization may take place sequentially or simultaneously for each of the red, green and blue strips during the period that a single optical fiber is activated. An alternative color scheme known commonly as the penetration phosphor method may be employed with the device of this invention. For this purpose plural overlying layers of phosphor of different color are incorporated. For example, a green emitting phosphor layer may be overcoated with a red emitting phosphor layer. By changing the potential of electron impact on the combined layer, the red or green phosphor layers may be energized to varying degress. For example, an electron beam at 8 KV may energize the red layer alone and at 12 KV the electrons may pass through the red layer and energize the green layer. In order to control the color, it is only necessary to switch the anode potential.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A vacuum panel display device including a viewing wall having thereon a phosphor layer on which information is displayed in response to electron beam excitation, the improvement comprising:

an electron source wall spaced from and parallel to said viewing wall, a generally planar array of parallel, elongate optical waveguide elements supported upon said electron source wall, a portion of each waveguide element bearing a coating of photoemissive material along its length a light energy source coupled to each of said waveguide elements for selectively introducing light into and along the length of each of said selected waveguide elements to cause photoemission of electrons from said coating along the length of said selectively illuminated waveguide elements, means for controlling the flow of electrons to said phosphor layer from preselected areas of said coating along the length of each selectively illuminated waveguide element and timng means associated with said light energy source for sequentially illuminating each of said optical waveguide elements in said array.

2. The vacuum panel display device defined in claim 1 wherein said optical waveguide elements comprise optical fibers.

3. The vacuum display device defined in claim 1 wherein said means for controlling the flow of electrons from preselected areas along said selectively illuminated waveguide element to said phosphor layer comprises an array of control wires lying generally in a plane parallel to and spaced from said array of waveguide elements such that said control wires are disposed at an angle relative to said waveguide elements and a parallel video signal source connected to said array of control wires to simultaneously act upon each of said control wires for selectively switching given wires, to allow electrons to pass from said preselected areas of said coating on a single waveguide element to said phosphor layer.

4. The vacuum panel display device defined in claim 3 wherein each of said control wires is connected to a bias potential source of sufficient magnitude to normally block passage of electrons from a portion of said photoemissive material on said waveguide element to said phosphor layer.

5. The vacuum panel display device defined in claim 4 including:

first timing means connected to said light energy source for sequentially illuminating each of said optical waveguide elements in a timed manner, second timing means connected to said parallel video signal source for stepping subsequent scan lines of signals from a supply to said parallel video signal source, and third timing means connected to said first and second timing means for stepping subsequent scan lines of signals to said control wires as each subsequent optical waveguide element is illuminated.

6. The vacuum panel display device defined in claim 1 wherein said electron source wall carries an array of elongated opaque spacers for optically separating said waveguide elements from one another.

7. The vacuum panel display device defined in claim 6 wherein said means for controlling the flow of electrons comprises an array of control wires lying in a plane generally parallel to and spaced from said array of waveguide elements and disposed substantially perpendicularly to said elements, and said control wires are supported upon said opaque spacers.

8. The vacuum panel display device defined in claim 1 wherein said viewing wall includes a conductive layer which is maintained at a positive electrical potential for accelerating electrons which are allowed to pass said controlling means.

9. The vacuum panel display device defined in claim 1 wherein said light energy source comprises a laser device and a scanning device for optically coupling the laser beam with each of said optical waveguide elements.

10. The vacuum panel display device defined in claim 1 wherein said phosphor layer comprises plural phosphors capable of emitting different colors.

* * * * *